United States Patent

MacGeorge

[15] 3,635,090
[45] Jan. 18, 1972

[54] PRESSURE TRANSDUCER

[72] Inventor: William D. MacGeorge, Doylestown, Pa.

[73] Assignee: Testing Technology Corporation, Langhorne, Pa.

[22] Filed: Dec. 8, 1969

[21] Appl. No.: 883,174

[52] U.S. Cl. .......................................................... 73/398 R
[51] Int. Cl. .......................................................... G01l 9/10
[58] Field of Search ...................... 73/398 R, 418, 407; 92/92

[56] References Cited

UNITED STATES PATENTS

| | | | |
|---|---|---|---|
| 2,222,259 | 11/1940 | Hoffmann et al. | 73/388 |
| 2,702,053 | 2/1955 | Baker | 73/407 X |
| 2,890,411 | 6/1959 | Whittaker et al. | 73/398 |
| 3,162,795 | 12/1964 | Cherniak | 73/398 X |
| 3,412,387 | 11/1968 | Millar | 73/418 X |
| 3,481,254 | 12/1969 | Wetherbee, Jr. | 92/92 |
| 745,636 | 9/1898 | Luscomb | 73/418 |

*Primary Examiner*—Donald O. Woodiel
*Attorney*—Zachary T. Wobensmith, 2nd

[57] ABSTRACT

A pressure transducer is provided suitable for high-pressure fluids which includes a relatively straight tube to which pressure is supplied internally, the tube being of unsymmetrical cross section and reduced in size along one side thereof for deflection upon increase of pressure applied therein, a linear variable differential transformer preferably being provided for takeoff of displacement in response to pressure change.

6 Claims, 5 Drawing Figures

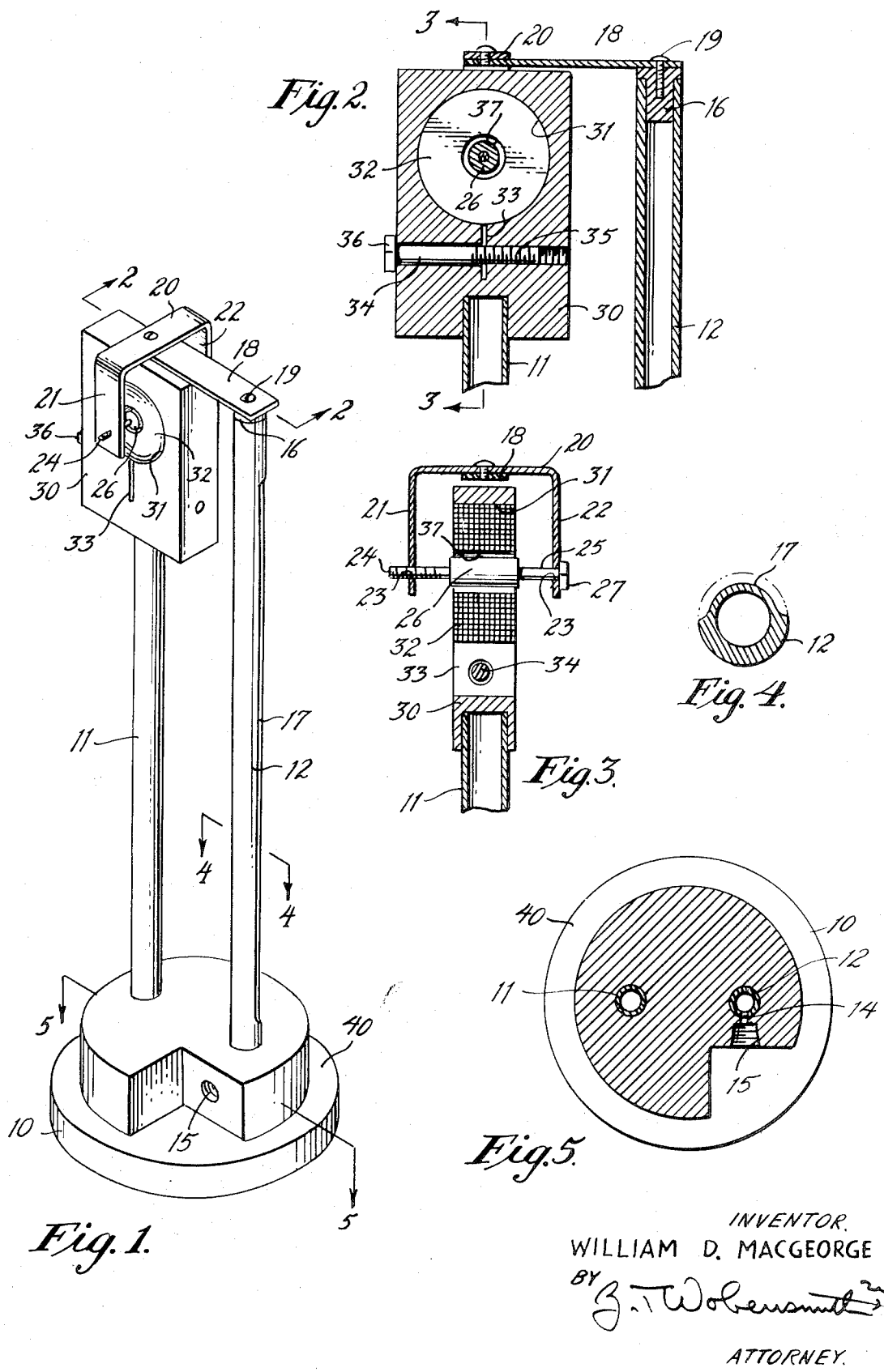

3,635,090

PRESSURE TRANSDUCER

BACKGROUND OF THE INVENTION

1. Field of the Invention

This invention relates to pressure transducers.

2. Description of the Prior Art

It has heretofore been proposed to use tubes of elliptical cross section curved between their ends with pressure supplied thereto at one end and with a linkage at the free end for movement responsive to change of pressure within the tube, these being commonly known as Bourdon tubes.

It has also heretofore been proposed as in the patents to Laimins U.S. Pat. No. 3,046,788 and to Mulcahy et al., U.S. Pat. No. 3,286,526 to employ linear tubes but as therein shown the measurement is made transversely of the tube rather than by change of position of the free end thereof.

SUMMARY OF THE INVENTION

In accordance with the invention, a pressure transducer is provided having a linear tube of unsymmetrical cross section with pressure applied to the interior thereof, the free end of the tube moving with change of internally applied pressure, the deflection preferably being measured by a linear variable differential transformer.

It is the principal object of the present invention to provide a pressure transducer which is simple in construction, reliable in its action, which can be used for a wide range of pressures, and which has a high order of linearity and low hysteresis effect in the operating range.

It is further object of the present invention to provide a pressure transducer which will have a high sensitivity with overrange.

Other objects and advantageous features of the invention will be apparent from the description and claims.

BRIEF DESCRIPTION OF THE DRAWINGS

The nature and characteristics features of the invention will be more readily understood from the following description taken in connection with the accompanying drawings forming part thereof, in which:

FIG. 1 is a view in perspective of a pressure transducer in accordance with the invention with the protective cover removed;

FIG. 2 is a fragmentary vertical sectional view taken approximately on the line 2—2 of FIG. 1;

FIG. 3 is a fragmentary vertical sectional view taken approximately on the line 3—3 of FIG. 2;

FIG. 4 is a horizontal sectional view, enlarged, taken approximately on the line 4—4 of FIG. 1; and FIG. 5 is a horizontal sectional view taken approximately on the line 5—5 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a base 10 is provided having a tubular post or support 11 secured to and extending therefrom and substantially parallel thereto a linear pressure-responsive tube 12 which is also secured in the base 10.

The base 10 has a fluid passageway 14 therein extending to and communicating with the lower end of the tube 12 and has a threaded portion 15 for connection of a pressure line (not shown) to apply the pressure to be measured.

The tube 12 is closed at its free end by a plug 16.

The tube 12 as shown more particularly in FIG. 4 is unsymmetrical in cross section so that one side thereof is weaker or less stiff and therefore has a greater tendency to bend or bow on the weaker side. While the shape of the tube 12 can be varied it is preferred that for approximately half its circumference it is reduced in diameter as at 17 to about one-half the diameter of the other half of its circumference.

The motion of the end of the tube 12 at which the plug 16 is mounted can be measured in any desired manner but it is preferred to secure an arm 18 thereto, such as by a screw 19.

The arm 18 has a bracket 20 carried thereby with spaced downwardly extending tabs 21 and 22.

The tabs 21 and 22 have aligned openings 23 through which mounting ends 22 and 25 of a core 26 extend. The end 24 can be in threaded engagement in the tab 21 and a head 27 on the end 25 can be utilized for varying the position of the core 26 in the bracket 20.

The support 11 has a coil clamp 30 carried thereon. The clamp 30 has a central opening 31 for the reception of the coil 32 of a linear variable differential transformer. A slot 33 extends from the opening 31 and a bolt 34 is provided extending in intersecting relation to the slot 33 and in threaded engagement at 35. The head 36 of the bolt 34 engages he outside of the clamp 30. Tightening of the bolt 34 permits of removably clamping the coil 32 in place. The coil 32 has a central opening 37 through which the core 25 extends for movement therein.

The base 10 is preferably provided with a shoulder 40 for the reception of a cylindrical cover (not shown).

The mode of operation will now be pointed out.

Pressure fluid from the source whose pressure is to be measured is applied to the passageway 14 and therefrom into the interior of the pressure tube 12.

The tube 12, upon the application of pressure therein, has the free end thereof moved as determined by the magnitude of the pressure applied therein and for a specific cross section of the tube 12. In a specific embodiment the pressure may range from 500 to 20,000 p.s.i. with a linearity of ±0.1 percent full scale, and with hysteresis less than 0.1 percent full scale.

The movement of the free end of the tube 12 is transferred by the bracket 20 to core 25 which by its movement in the coil 32 provides a variable output signals from the coil 32 which gives a measure of the pressure effective within the tube 12 and deflecting the free end thereof.

It will thus be seen that apparatus has been provided for effecting the objects of the invention.

I claim:

1. A pressure transducer comprising
   a base,
   an elongated unitary substantially straight pressure-responsive tube fixedly mounted at one end in said base and having a closed free end,
   a fluid connection in communication with said fixedly mounted end,
   said tube along opposite sides thereof having elongated portions of different wall thicknesses to provide a different stiffness along one side thereof for substantially linearly moving the free end of said tube with increase of curvature upon increase of pressure,
   said portions having different radii to determine the respective wall thickness of said tube, he portion of greater radius corresponding not more than half the circumference of the tube, and
   motion-responsive means actuated by the free end of said tube.

2. A pressure transducer as defined in claim 1 in which
   said last-mentioned means includes a linear variable differential transformer.

3. A pressure transducer as defined in claim 2 in which
   said transformer has a fixed coil portion supported on said base and a movable core positioned by the free end of said tube.

4. A pressure transducer as defined in claim 1 in which
   said base has a post carried thereby, and
   said post carries a fixed coil, and
   said tube carries a core disposed within said coil and movable by the free end of the tube.

5. A pressure transducer as defined in claim 1 in which said motion-responsive means provides a signal responsive to change of position of said free end.

6. A pressure transducer as defined in claim 1 in which said tube is of circular exterior cross section.

* * * * *

UNITED STATES PATENT OFFICE
CERTIFICATE OF CORRECTION

Patent No. 3,635,090   Dated January 18, 1972

Inventor(s) WILLIAM D. MACGEORGE

It is certified that error appears in the above-identified patent and that said Letters Patent are hereby corrected as shown below:

SPECIFICATION

Column 2,

Line 20, after "engages" "he" should be - the - .

Claim 1,

Line 59, before "portion" "he" should be - the - ,

Line 60, after "corresponding" - to - should be inserted.

Signed and sealed this 30th day of May 1972.

(SEAL)
Attest:

EDWARD M. FLETCHER, JR.
Attesting Officer

ROBERT GOTTSCHALK
Commissioner of Patents